(12) United States Patent
Andrew

(10) Patent No.: US 12,091,131 B2
(45) Date of Patent: Sep. 17, 2024

(54) INSERT UNDERCUT

(71) Applicant: Fox Factory, Inc., Duluth, GA (US)

(72) Inventor: Fraser Andrew, North Vancouver (CA)

(73) Assignee: Fox Factory, Inc., Duluth, GA (US)

( * ) Notice: Subject to any disclaimer, the term of this patent is extended or adjusted under 35 U.S.C. 154(b) by 0 days.

(21) Appl. No.: 17/528,604

(22) Filed: Nov. 17, 2021

(65) Prior Publication Data

US 2022/0250711 A1    Aug. 11, 2022

Related U.S. Application Data

(60) Provisional application No. 63/116,614, filed on Nov. 20, 2020.

(51) Int. Cl.
*B62M 3/08* (2006.01)

(52) U.S. Cl.
CPC ..................................... *B62M 3/08* (2013.01)

(58) Field of Classification Search
CPC ............ B62M 3/08; B62M 3/00; B29C 70/68
See application file for complete search history.

(56) References Cited

U.S. PATENT DOCUMENTS

| | | | |
|---|---|---|---|
| 7,527,277 B2 | 5/2009 | Nonoshita et al. | |
| 7,610,832 B2 | 11/2009 | Guiseppe et al. | |
| 8,707,823 B2 | 4/2014 | Dal Pra | |
| 10,036,443 B2 | 7/2018 | Galasso et al. | |
| 11,142,280 B2 | 10/2021 | Dubois et al. | |
| 2005/0178236 A1 | 8/2005 | Crozet et al. | |
| 2006/0283288 A1* | 12/2006 | Feltrin | F16B 37/125 74/594.1 |
| 2007/0227293 A1* | 10/2007 | Valle | B62M 3/00 74/594.1 |
| 2010/0275724 A1 | 11/2010 | Staples et al. | |
| 2010/0326233 A1 | 12/2010 | Schlanger | |

(Continued)

FOREIGN PATENT DOCUMENTS

| | | | | |
|---|---|---|---|---|
| CN | 109421879 A | * | 3/2019 | ............. B62M 3/00 |
| DE | 102005018608 A1 | * | 2/2006 | ............. B62M 3/00 |

(Continued)

OTHER PUBLICATIONS

Machine translation of CN 109421879 A, Furuya, Mar. 5, 2019 (Year: 2019).*

(Continued)

*Primary Examiner* — Vinh Luong

(57) ABSTRACT

The insert is metallic and has a first coefficient of thermal expansion (CTE), the insert comprising an outer wall of a first retaining feature; and an undercut shape formed exterior to the outer wall of the first retaining feature such that there is a groove between the outer wall of the first retaining feature and the undercut shape. A composite component having a second CTE different from the first CTE, wherein the insert including the groove is at least partially within the composite component when the composite component is being formed, such that the difference in the first CTE and the second CTE causes the groove between the outer wall of the first retaining feature and the undercut shape of the insert to contract about the composite component to provide a compression to a portion of the composite component within the groove.

17 Claims, 9 Drawing Sheets

(56) References Cited

U.S. PATENT DOCUMENTS

| | | |
|---|---|---|
| 2014/0157949 A1 | 6/2014 | Foley |
| 2014/0196569 A1 | 7/2014 | Nonoshita et al. |
| 2014/0345419 A1* | 11/2014 | Staples ................ B29C 70/742 |
| | | 74/594.1 |
| 2017/0274960 A1 | 9/2017 | Dubois et al. |
| 2017/0275724 A1 | 9/2017 | McEwan et al. |
| 2017/0292598 A1* | 10/2017 | Moore ................... B22D 25/02 |
| 2019/0061292 A1 | 2/2019 | Chen |
| 2022/0234307 A1* | 7/2022 | Escowitz ............. B29C 70/745 |
| 2023/0014123 A1* | 1/2023 | Andrew ................... B62M 3/08 |
| 2023/0111794 A1* | 4/2023 | Lee ......................... B62M 1/36 |
| | | 74/594.1 |

FOREIGN PATENT DOCUMENTS

| | | | | |
|---|---|---|---|---|
| DE | 202017107695 U1 | 3/2018 | | |
| DE | 102018213090 A1 * | 2/2019 | ............. | B62M 3/00 |
| EP | 1281609 A2 | 2/2003 | | |
| EP | 1840023 B1 | 8/2011 | | |
| EP | 4001081 A1 * | 5/2022 | ............. | B62M 3/00 |
| JP | 5736434 B2 | 4/2015 | | |
| TW | 200502132 A | 1/2005 | | |
| TW | 201529406 A | 8/2015 | | |
| TW | 201739659 A | 11/2017 | | |
| WO | WO 03/000543 A1 * | 1/2003 | ............. | B62M 3/00 |
| WO | 2014048252 A1 | 4/2014 | | |

OTHER PUBLICATIONS

Define groove, Microsoft Bing, Mar. 6, 2024 (Year: 2024).*
English abstract of DE 102018213090 A1, Furuya, Feb. 21, 2019 (Year: 2019).*
Taiwan First Office Action for Taiwanese Application No. 110143230, Dated Jul. 12, 2022, 10 Pages.
Extended European Search Report for EP Application No. 21209380. 1, 12 Pages, Mailed Mar. 24, 2022.

* cited by examiner

INSERT UNDERCUT

CROSS REFERENCE

This application claims priority to and benefit of U.S. Provisional Patent Application No. 63/116,614 filed on Nov. 20, 2020, entitled "Undercut Inserts" by Fraser Andrew and assigned to the assignee of the present application, the disclosure of which is hereby incorporated herein by reference in its entirety.

FIELD OF THE INVENTION

Embodiments of the invention generally relate to bicycle components such as crank arms and methods for making bicycle components.

BACKGROUND

Typically, a metallic cylindrical insert is co-cured into the composite arm with features to transmit torque and other loads from one material to the other. Metallic inserts are used in carbon to provide more robust interfaces for threaded or splined components. Typically with mechanical features to transmit torque and other loads from the one material to the other. Composite and metallic materials typically have different coefficients of thermal expansion (CTE). Typically the composite has a lower CTE than the metallic insert, As the composite needs to be cured around the metallic insert at an elevated temperate than room or typically use condition temperate, the metallic insert expands before and during the curing of the composite. The part is then cooled after being cured or molded. The composite arm/body typically does not change dimension, but the metallic insert tends to get smaller in all dimensions. The amount depends on its CTE for the specific material. This change in temperature causes the different materials to change size. Typically the composite keeps its original shape and the metallic insert contracts to a smaller size. This shrinking happens evenly in all its dimensions. As the insert shrinks it causes a stress to build up at the interface between composite and metallic. Depending on how good the bond at the interface is, the insert may completely separate from the composite body. If the insert does not separate from the composite, a residual stress will be present at this interface. Both these conditions will cause the part to be weaker and not able to carry as high external loads when in use (like pedaling loads).

BRIEF DESCRIPTION OF THE DRAWINGS

Aspects of the present invention are illustrated by way of example, and not by way of limitation, in the accompanying drawings, wherein.

Figure 1:
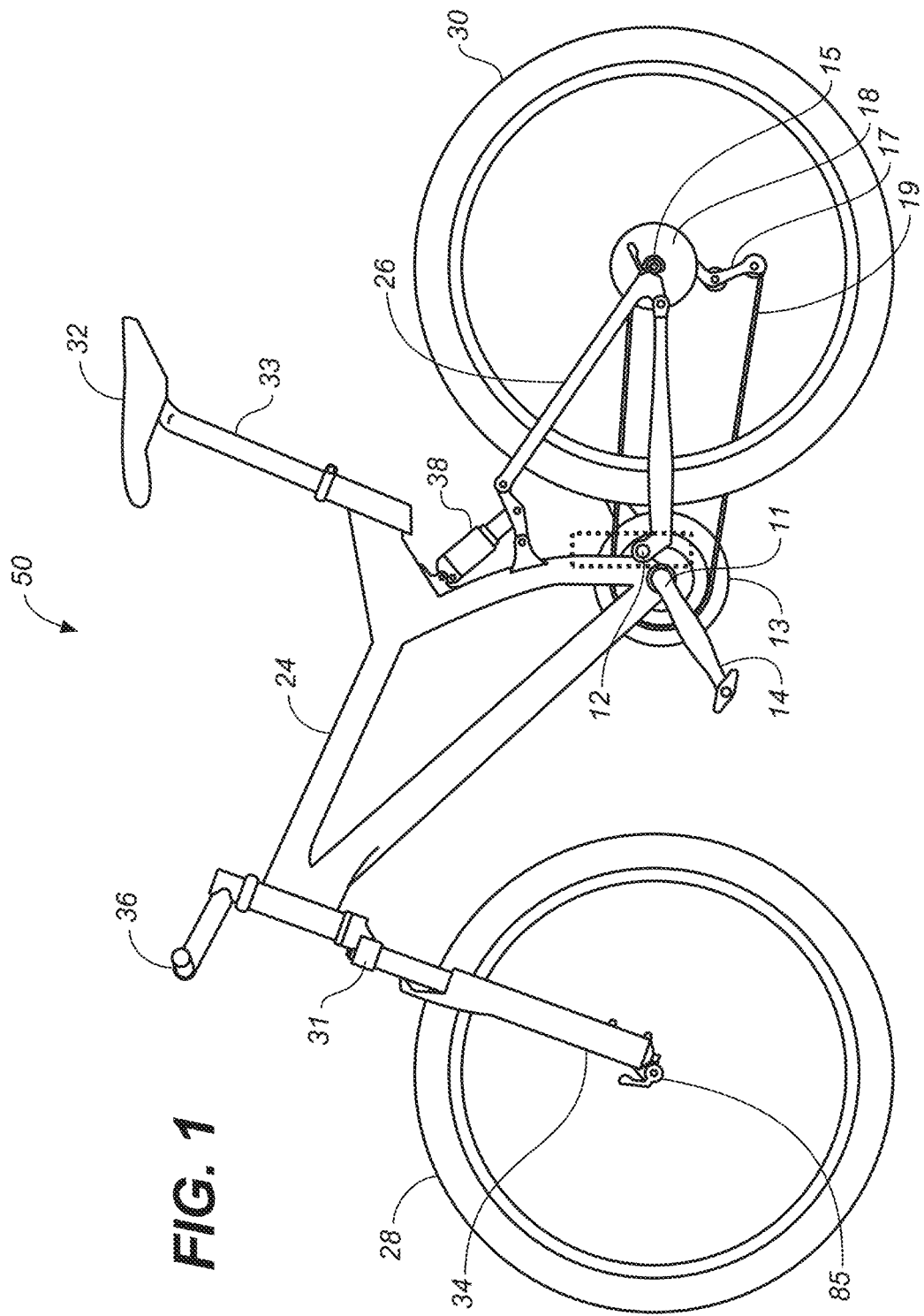
FIG. 1 is a perspective view of a bicycle, in accordance with an embodiment.

The drawings referred to in this description should be understood as not being drawn to scale except if specifically noted.

DESCRIPTION OF EMBODIMENTS

The detailed description set forth below in connection with the appended drawings is intended as a description of various embodiments of the present invention and is not intended to represent the only embodiments in which the present invention is to be practiced. Each embodiment described in this disclosure is provided merely as an example or illustration of the present invention, and should not necessarily be construed as preferred or advantageous over other embodiments. In some instances, well known methods, procedures, objects, and circuits have not been described in detail as not to unnecessarily obscure aspects of the present disclosure.

The difference in thermal expansion properties between a composite and metallic part, is commonly known as differential thermal expansion. As the composite is molded around a cylindrical metallic insert at an elevated temperature, in order to cure the resin, the metallic insert has a larger shape in the hot condition. The whole part is then cooled and the metallic part contracts to a smaller shape, as the composite (which has a different thermal expansion coefficient) tends to stay at a larger shape or close to the hot shape (it has smaller change in shape due temperature). Based on these thermal expansion property differences, during cooling the metallic portion will try to contract and separate from the composite, which causes a large stress at the bond between the composite and metallic component leading to a failure of the bond. This failure can happen even before the design/external load is applied.

Embodiment disclosed herein provide a number of shapes and retaining features within the insert thereby using the different thermal expansion coefficients of the two materials to improve the strength of the joint rather than compromise it.

One embodiment utilizes a hooked or undercut shaped feature on the insert which will provide at least one surface that will be trying to compress the composite after the part is cooled from curing. The design of this metallic insert shape is in such a way that some of the composite sits effectively within (or about) a portion the metallic insert so it is compressed as by the insert as the structure cools.

In one embodiment, the insert is partly cylindrical but also has portions that extend outward along the body of the crank to react torque loads, and any other loads that are encountered. In one embodiment, the design also keeps section changes or sharp angle changes in the composite to a minimum, which allows the strength of the composite to be utilized to it potential.

In the following discussion, one or more components are molded together to become an un-separable body. In one embodiment, instead of two inserts, one of the two inserts would not be used and a direct connection for that end of the arm could be used.

In one embodiment, a spindle insert refers to a metallic part, typically a forged or machined aluminum alloy, titanium alloy, steel, other metal alloys, metals, or the like. Either with a spline to accept a spindle or with an integrated spindle. One embodiment may also have other features on the insert to transmit load or locate chainrings, bearing preload collar, self-extracting bolt cap.

In one embodiment, a pedal insert refers to a metallic part, typically a forged or machined aluminum alloy, titanium alloy, steel, other metal alloys, metals, or the like. Often, the pedal insert will have a standard thread to fit pedals therein.

In one embodiment, the spindle insert is partly encapsulated at one end of the composite arm. In one embodiment, the pedal insert is partly encapsulated at the opposite end of the composite arm to the spindle.

In the following discussion, a composite arm could be thermoplastic or thermoset matrix, with a variety of fiber materials, most typically carbon fiber, glass fiber or other fibers could also be used partially or solely. The purpose of the composite arm is to transmit the load from the pedal insert to the spindle insert.

In general, the crank arm is used to transmit a force that the users leg generates on the pedal to the chainring. The force is transmitted from the pedal to the crank then to the chainring to eventually turn the rear wheel. The crank arm also locates the pedals in relation to the bicycle frame, even under harsh loads from obstacles or descending.

In one embodiment, the crank arm typically has a length of 155-175 mm (between inserts, e.g., between pedal axle centerline and spindle centerline). In one embodiment, pedal insert would fit inside a 50×30×20 mm box volume (L×W×H) and spindle insert would be 70×50×30 mm volume. Although a number of lengths, sizes, measurements, and volumes is provided, these are provided as examples of one embodiment. It should be appreciated that the present technology could utilize one or more different lengths, sizes, measurements, and volumes.

In the following discussion, and for purposes of clarity, a bicycle is utilized as the example vehicle. However, in another embodiment, the undercut insert could be used on one or more of a variety of vehicles such as, but not limited to, a bicycle, an electric bike (e-bike), a moped, or the like. In one embodiment, the undercut insert shape and features described herein may be used in another composite/metal hybrid component to provide the retaining features resulting from the undercut insert shape.

Referring now to FIG. 1, a perspective view of a bicycle 50 is shown in accordance with an embodiment. In one embodiment, bicycle 50 has a frame 24 with a suspension system comprising a swing arm 26 that, in use, is able to move relative to the rest of frame 24; this movement is permitted by, inter alia, rear shock assembly 38. The front fork assembly 34 also provide a suspension function via a shock assembly in at least one fork leg.

In one embodiment, bicycle 50 is a full suspension bicycle. In another embodiment, bicycle 50 has only a front suspension and no rear suspension (e.g., a hard tail). In different embodiments, bicycle 50 could be a road bike, a mountain bike, a gravel bike, an electric bike (e-bike), a hybrid bike, a motorcycle, or the like.

In one embodiment, swing arm 26 is pivotally attached to the frame 24 at pivot point 12 which is located above the bottom bracket axis 11. Although pivot point 12 is shown in a specific location, it should be appreciated that pivot point 12 can be found at different distances from bottom bracket axis 11 depending upon the rear suspension configuration. The use of the specific pivot point 12 herein is provided merely for purposes of clarity. Bottom bracket axis 11 is the center of the pedal and crank assembly 13. Although pivot point 12 is shown in a specific location, it should be appreciated that pivot point 12 can be found at a different location depending upon the rear suspension configuration. The use of the pivot point 12 herein is provided merely for purposes of clarity.

For example, in a hardtail bicycle embodiment, there would be no pivot point 12. In one embodiment of a hardtail bicycle, frame 24 and swing arm 26 would be formed as a fixed frame.

Bicycle 50 includes a front wheel 28 which is coupled with the front fork assembly 34 via axle 85. In one embodiment, front fork assembly 34 includes a crown 31. In one embodiment, a portion of front fork assembly 34 (e.g., a steerer tube) passes through the frame 24 and couples with handlebar assembly 36. In so doing, the front fork assembly and handlebars are rotationally coupled with the frame 24 thereby allowing the rider to steer the bicycle 50.

In one embodiment, bicycle 50 includes a rear wheel 30 which is coupled to the swing arm 26 at rear axle 15. A rear shock assembly 38 is positioned between the swing arm 26 and the frame 22 to provide resistance to the pivoting motion of the swing arm 26 about pivot point 12. Thus, the illustrated bicycle 50 includes a suspension member between swing arm 26 and the frame 24 which operate to substantially reduce rear wheel 30 impact forces from being transmitted to the rider of the bicycle 50.

In one embodiment, bicycle 50 is driven by a chain 19 that is coupled with both crank assembly 13 and rear sprocket 18. As the rider pedals, the rotational input to crank arms 100 cause the crank assembly 13 to rotate about bottom bracket axis 11. This rotation applies a force to chain 19 which transfers the rider generated rotational energy to rear sprocket 18 which results in the rotation of rear wheel 30. Chain tension device 17 provides a variable amount of tension on chain 19. The need for chain 19 length variation can be due to a number of different gears that may be on one or both of crank assembly 13 and/or rear sprocket 18 and/or changes in chain stay length as the distance between bottom bracket axis 11 (where crank assembly 13 attaches to frame 24) and the rear axle 15 changes due to suspension articulation.

In one embodiment, saddle 32 is connected to the frame 24 via seatpost 33. In one embodiment, seatpost 33 is a dropper seatpost.

In one embodiment, bicycle 50 may include one or more active suspension components, sensors, and the like, such as disclosed in U.S. Pat. No. 10,036,443 which is incorporated by reference herein, in its entirety.

Figure 2:
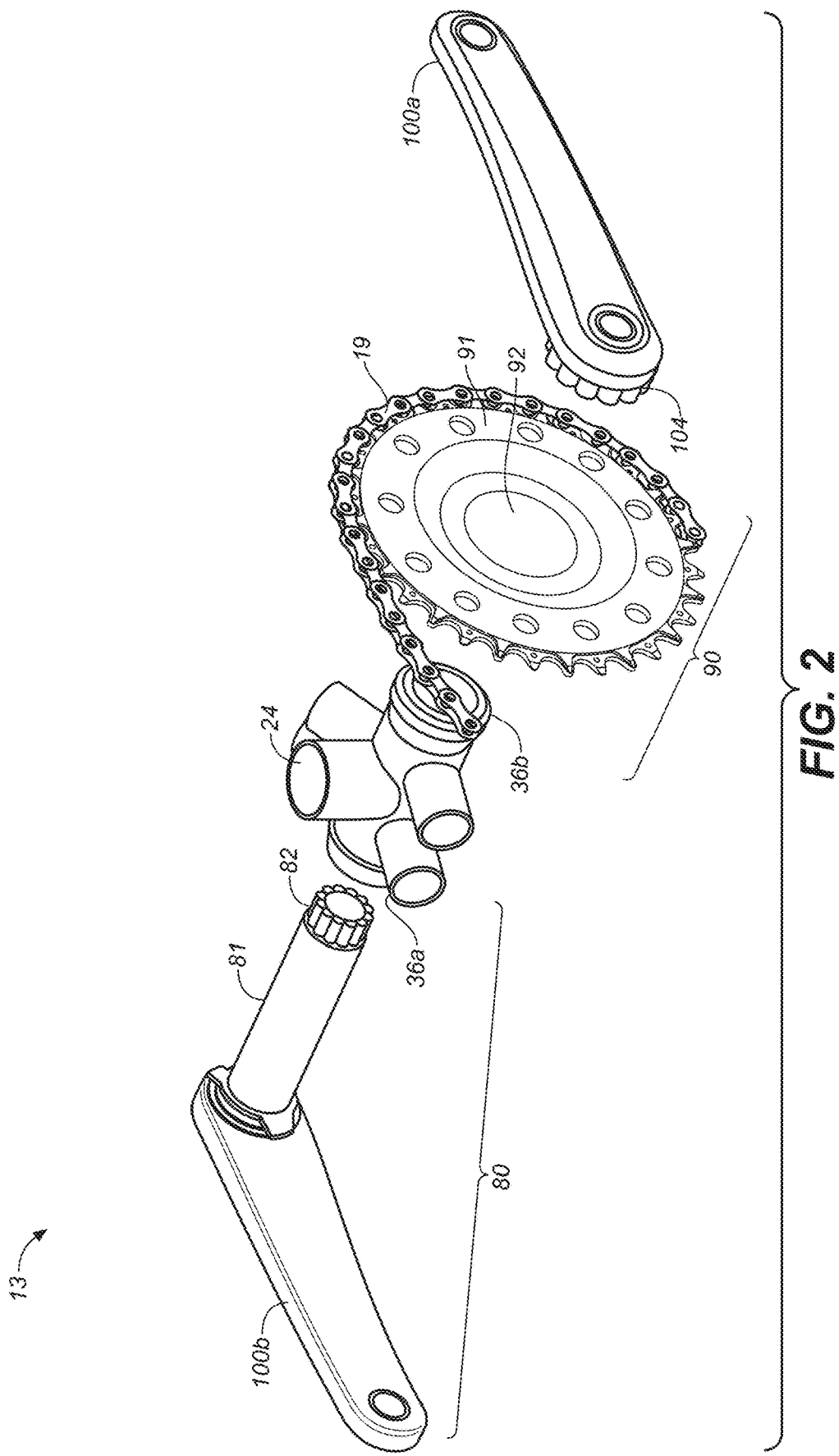
FIG. 2 is an exploded view of a crank assembly, in accordance with an embodiment.

Referring now to FIG. 2, an exploded view of a crank assembly 13 is shown in accordance with an embodiment. In FIG. 2, crank assembly 13 is shown in conjunction with a portion of bicycle frame 24. In one embodiment, bicycle frame 24 includes a bottom bracket shell 36a and a bottom bracket shell 36b.

In one embodiment, crank assembly 13 includes a left-hand non-drive side crank assembly 80 which includes a left-hand crank arm 100b and a spindle 81 that, in one embodiment includes a spindle interface 82.

In one embodiment, crank assembly 13 includes a right-hand drive side crank assembly 90 which includes a right-hand drive side crank arm 100a with a spindle receiving interface (such as spindle insert 104), a chainring 91 with opening 92, and a roller chain 19. In one embodiment, crank assembly 13 includes additional parts such as, pedals, pedal washers, dust caps, spindle spacers, bearings, hex nuts, and the like. Those parts are not shown for purposes of clarity.

In one embodiment, e.g., during manufacture, assembly, maintenance, rebuild, component replacement, and the like of left-hand non-drive side crank assembly 80, spindle 81 is coupled with left-hand crank arm 100b. In one embodiment, spindle 81 is fixedly coupled with left-hand crank arm 100b at the time of manufacture and/or assembly. In one embodiment, spindle 81 and left-hand crank arm 100b are manufactured as a single component. In one embodiment, spindle 81 and left-hand crank arm 100b are two distinctly different components removably coupled at the time of assembly.

In one embodiment, e.g., during manufacture and/or assembly of the right-hand drive side crank assembly 90, chainring 13 is coupled with right-hand drive side crank arm 100a. In one embodiment, chainring 13 is fixedly coupled with right-hand drive side crank arm 100a at the time of manufacture and/or assembly. In one embodiment, chainring 13 and right-hand drive side crank arm 100a are manufactured as a single component. In one embodiment, chainring 13 and right-hand drive side crank arm 100a are two distinctly different components removably coupled at the time of assembly.

In one embodiment, to install the crank assembly 13 into frame 24 of bicycle 50, spindle 81 is inserted through a portion of bicycle frame 24 (including bottom bracket shell 36a and bottom bracket shell 36b) and opening 92 of chainring 13. Spindle interface 82 is coupled with pedal insert 106 on right-hand drive side crank assembly 90.

During the installation of crank assembly 13 into frame 24, one or more bearings (or the like) will be placed around spindle 81 and between bottom bracket 222 and bottom bracket shell 36a before spindle 81 is inserted into frame 24. Once spindle 81 is passed through frame 24, one or more bearings (or the like) will be placed around spindle 81 and between pedal insert 106 and bottom bracket shell 36b. In one embodiment, the one or more bearings (or the like) allow the rotational movement of spindle 81 within the frame 24 while also maintaining a fixed and proper orientation of spindle 81 within frame 24.

In one embodiment, some of the components of crank assembly 13 comprise a material such as an aluminum alloy, a titanium alloy, steel, other metal alloys, metals, ceramic, or the like. In one embodiment, some of the components of crank assembly 13 comprise a composite material such a composite material with a thermoset or thermoplastic matrix, a long or short fiber thermoplastic or thermoset composite, injection molded carbon fiber, carbon fiber reinforced nylon, carbon fiber reinforced epoxy resin, glass filled nylon, a compression molded material, composite layering, chopped carbon fibers, plastic, a polymer, long fiber-reinforced plastics, short-fiber reinforced plastics, or the like. In one embodiment, one, some, or all of the components of crank assembly 13 could be formed from a combination of these materials, e.g., a composite/metal hybrid. The crank assembly can be manufactured by a variety of methods such as compression molding, bladder molding, vacuum molding, resin transfer molding (RTM), filament winding, automated fiber placement (AFP), automated tape laying (ATL), or the like.

Figure 3A:
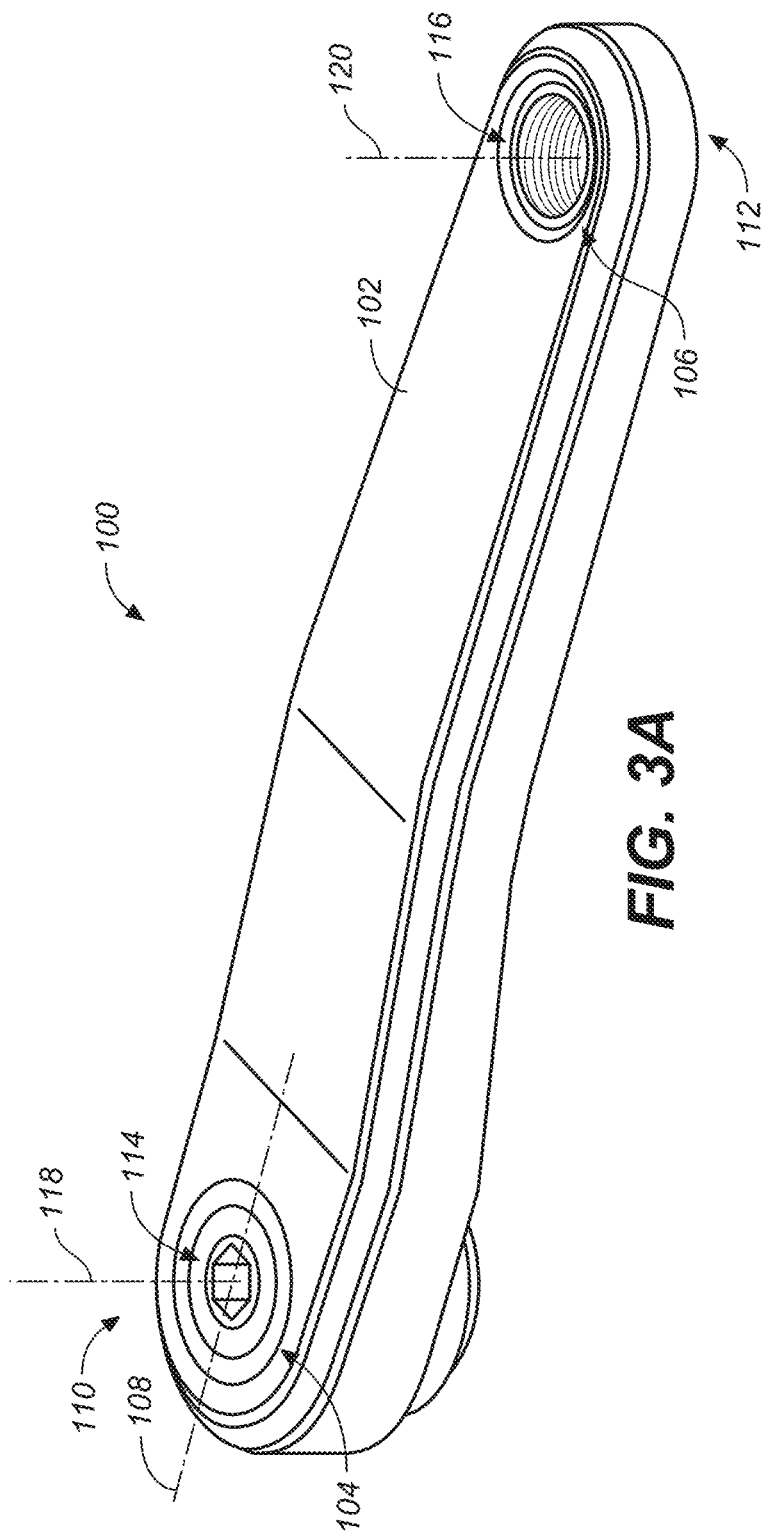
FIG. 3A is a perspective view of an example of a crank arm with inserts, in accordance with an embodiment.

Referring now to FIG. 3A, one example of a crank arm 100 (which is exemplary of either drive side crank arm 100a or non-drive side crank arm 100b except as identified herein) includes a body 102 and a first insert (e.g., spindle insert 104 or pedal insert 106). In one embodiment, the crank arm 100 also includes body 102, a first insert, and a second insert (e.g., spindle insert 104 and pedal insert 106). While currently illustrated with two inserts (e.g., spindle insert 104 and pedal insert 106), crank arm 100 may be configured to include a different number of inserts, including, for example, only one insert, or three or more inserts (such as a stringer insert or another additional structural insert, etc.).

Body 102 is generally elongate and extends along a body axis 108 between a first end 110 and a second end 112. In one embodiment, spindle insert 104 is fixedly coupled with body 102 and facilitates coupling with spindle 81, while pedal insert 106 is fixedly coupled with body 102 and facilitates coupling with a pedal or pedal assembly.

In one embodiment, body 102 is formed from a body material, and the spindle insert 104 and pedal insert 106 are formed from an insert material, which can be different than the body material. In one embodiment, the body 102 is formed from a composite material comprising a carbon fiber, and the spindle insert 104 and/or pedal insert 106 are formed from an aluminum alloy. Alternatively, the body 102 may be formed from any other suitable material, including, for example, composite materials comprising fiberglass, Kevlar, boron fiber or beryllium fiber, or metal or plastic or a polymer. The spindle insert 104 and/or pedal insert 106 may be formed from any suitable material that has the desired strength to support the rotatable connection between the crank arm and other bicycle components including, for example, aluminum, steel, titanium, other metals and metal alloys, composites, and/or polymers or plastics.

In one embodiment, each of spindle insert 104 and pedal insert 106 includes a central bore or aperture (e.g., bore 114 and bore 116 respectively) configured to accommodate a fastener. The bores 114 and 116 may be threaded or otherwise configured to mate with a corresponding fastener. In one embodiment, both spindle insert 104 and pedal insert 106 extend along respective insert axis 118 and insert axis 120.

In one embodiment, the exterior features (e.g., the insert undercut retaining shape) of spindle insert 104 and pedal insert 106 are similar in shape. In one embodiment, the exterior features (e.g., the insert undercut retaining shape) of spindle insert 104 and pedal insert 106 are different from each other.

In one embodiment, the interior features of spindle insert 104 and pedal insert 106 are similar. In one embodiment, the interior features of spindle insert 104 and pedal insert 106 are different from each other. For example, in one embodiment, providing differently interiorly configured inserts may help facilitate different types of connections between the crank arm 100, such as a first interior shape of spindle insert 104 to receive/couple with spindle 81 and a different interior shape of pedal insert 106 (as compared with the interior shape of spindle insert 104) to receive/couple with the pedal assembly.

Figure 3B:
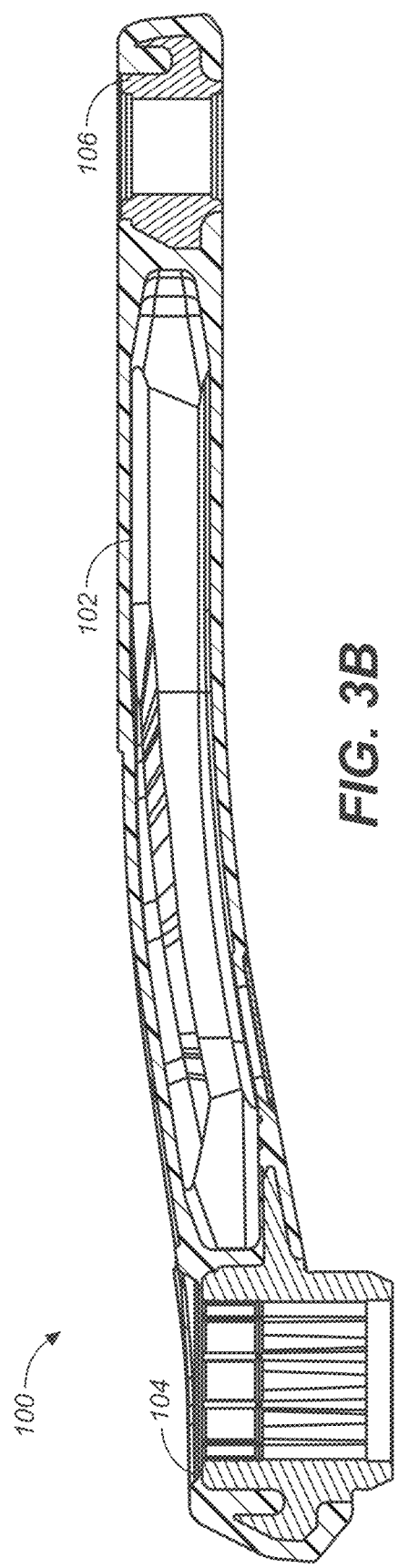
FIG. 3B is a cross-section view of the example of the crank arm with inserts, in accordance with an embodiment.

Referring now to FIG. 3B, a cross-section view of the example of the crank arm 100 with inserts is shown in accordance with an embodiment. In FIG. 3B, the cross-section of crank arm 100 includes the spindle insert 104 and the pedal insert 106. The features of FIG. 3B are similar to those of 3A, and as such, the discussion of the features shown in FIG. 3A is not repeated for purposes of clarity.

In one embodiment, crank arm 100 is a long slender "Composite body" having a length which is multiple times larger than the width or thickness. In one embodiment, the crank arm 100 is made of a thermoset or thermoplastic matrix material and a reinforcing fiber material. The center can be hollow or solid. In one embodiment, the crank arm 100 has two cylindrical inserts spaced a set distance apart that have parallel axes.

In one embodiment, pedal insert 106 is a metallic insert that is placed in the composite used to form crank arm 100 before curing and the composite is cured around the pedal insert 106 to create a single structure. In general, the pedal insert 106 is used to create a robust interface to attach a pedal thereto. In one embodiment, the pedal is threaded into the pedal insert 106. In one embodiment, the metallic pedal insert 106 keeps the thread robust and allows repeated removal and fitting.

In one embodiment, spindle insert 104 is a metallic insert that is placed in the composite used to form crank arm 100 before curing and the composite is cured around the spindle insert 104 to create a single structure. In general, the spindle insert 104 is used to create a robust interface to attach a spindle and sometimes chainring which is used to transmit load from the composite body to the spindle or chainring. In one embodiment, the spindle insert 104 is typically made of metal or a metal alloy to allow repeated installation and removal of the spindle and chainring and allow threaded fasteners/lockrings to be fitted thereto.

Figure 4A:
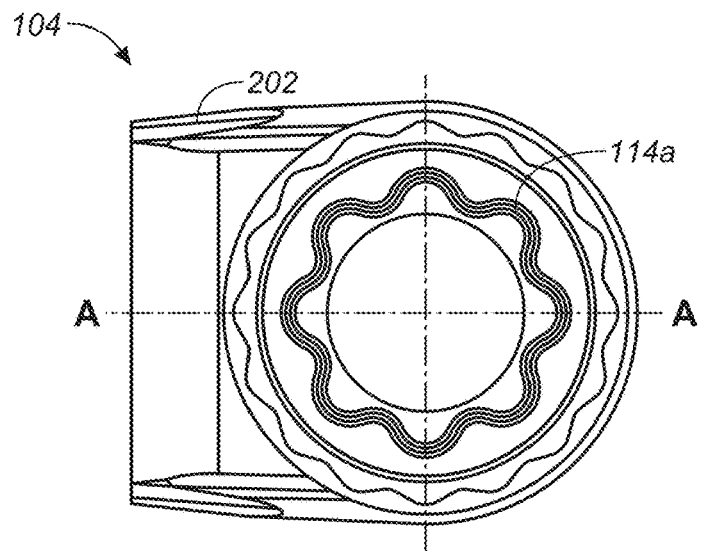
FIG. 4A is a perspective view of an example of a spindle insert for the crank arm, in accordance with an embodiment.

With reference now to FIG. 4A, a perspective view of an example of spindle insert 104 for the crank arm 100 is shown in accordance with an embodiment. In general, spindle insert 104 includes a spindle retention shape 114a surrounding the bore 114. To help secure the spindle insert 104 within the body 102, the spindle insert 104 can include one or more undercut(s) 202 that are configured to be embedded in and encased by the body 102.

In general, undercut 202 (which may be a hooked shape or the like) is formed as part of the insert that encompasses the composite of body 102. In one embodiment, as the metallic spindle insert 104 and/or pedal insert 106 cools, the undercut 202 will want to compress on to the composite body 102 rather than pull away from the composite body 102. This will create an interface surface between the composite body 102 and spindle insert 104 and/or pedal insert 106 that is being compressed together and will resist pulling apart; thereby allowing the bond between the parts to be more robust and allow much higher external loads before failing.

In one embodiment, the undercuts 202 can be directionally configured to help inhibit rotation of the spindle insert 104 relative to the body 102 about the insert axis 118 (as shown in FIG. 3A) and/or to help inhibit translation of the spindle insert 104 relative to the body 102 along the insert axis 118. For example, the spindle insert 104 (and similarly pedal insert 106) will have features that extend along the long axis 108 of the crank 100 to provide torsional resistance and resistance to other load that may be encountered.

Figure 4B:
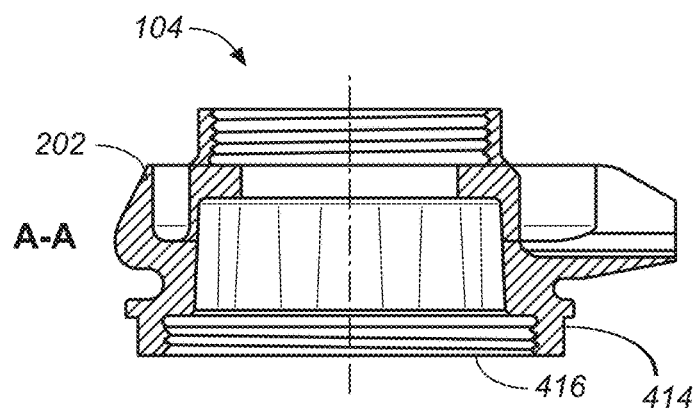
FIG. 4B is a cross-section view A-A of the example of the spindle insert for the crank arm, in accordance with an embodiment.

FIG. 4B is a cross-section view A-A of the example of the spindle insert 104 for the crank arm 100 shown in accordance with an embodiment. In one embodiment, spindle insert 104 includes a cinch 414 (e.g., an external spline) which includes a retaining feature such as threads, splines, or the like, to locate chainring 91. In one embodiment, spindle insert 104 includes an internal retaining feature 416, such as threads, or the like, for a lockring. In one embodiment, the spindle insert 104 including the internal retaining feature 416 is only necessary for the drive side crank 100a. In one embodiment, the spindle insert 104 on the non-drive side crank 100b does not need the internal retaining feature 416.

Figure 4C:
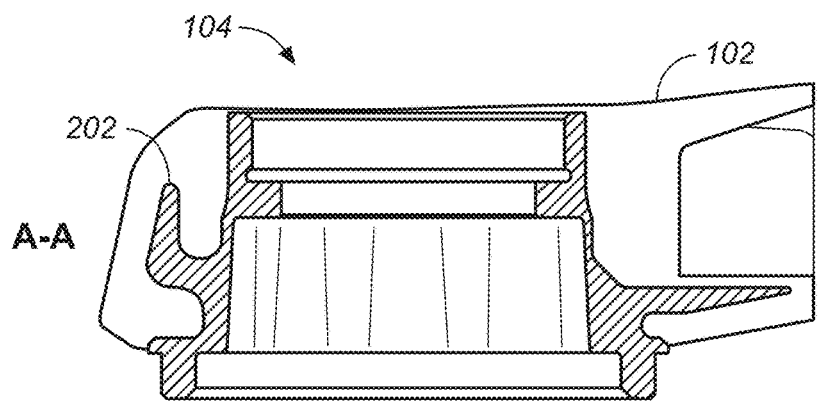
FIG. 4C is a cross-section view A-A of the spindle insert in a portion of the crank arm body, in accordance with an embodiment.

FIG. 4C is a cross-section view A-A of the spindle insert 104 in a portion of the crank arm body 102 shown in accordance with an embodiment.

Figure 5A:
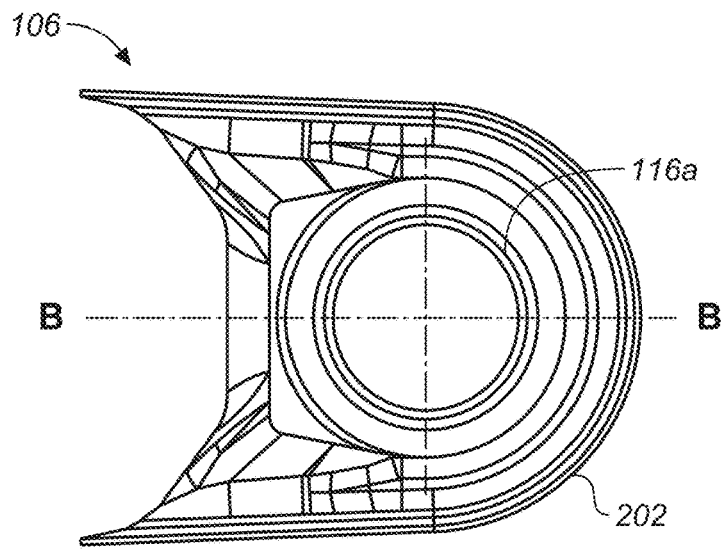
FIG. 5A is a perspective view of an example of a pedal insert for the crank arm, in accordance with an embodiment.

FIG. 5A is a perspective view of an example of a pedal insert 106 for the crank arm 100 shown in accordance with an embodiment. In general, pedal insert 106 includes a generally cylindrical portion surrounding the bore 116. To help secure the pedal insert 106 within the body 102, the pedal insert 106 can include one or more undercuts 202 that are configured to be embedded in and encased by the body 102. The undercuts 202 can be directionally configured to help inhibit rotation of the pedal insert 106 relative to the body 102 about the insert axis 120 (as shown in FIG. 3A) and/or to help inhibit translation of the pedal insert 106 relative to the body 102 along the insert axis 120.

Figure 5B:
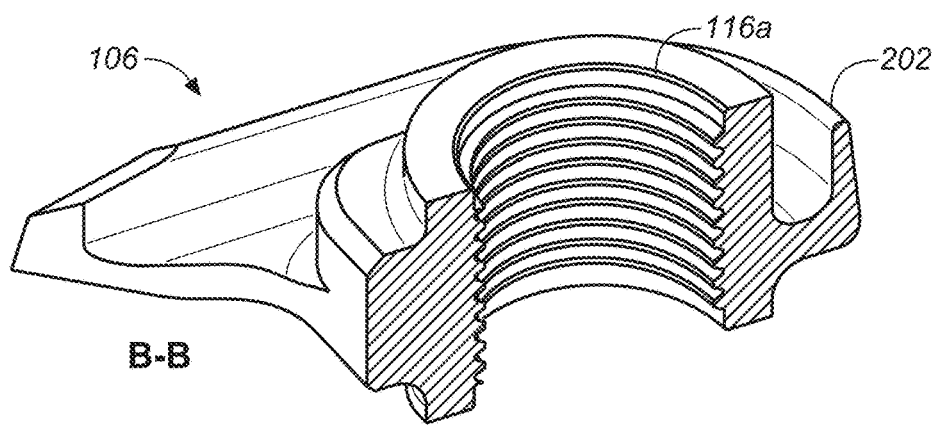
FIG. 5B is a cross-section view B-B of the example of the pedal insert for the crank arm, in accordance with an embodiment.

FIG. 5B is a cross-section view of the example of the pedal insert 106 for the crank arm 100 shown in accordance with an embodiment. In one embodiment, pedal insert 106 includes an internal retaining feature 116a such as threads, or the like, for coupling a pedal therewith and undercuts 202.

Figure 5C:
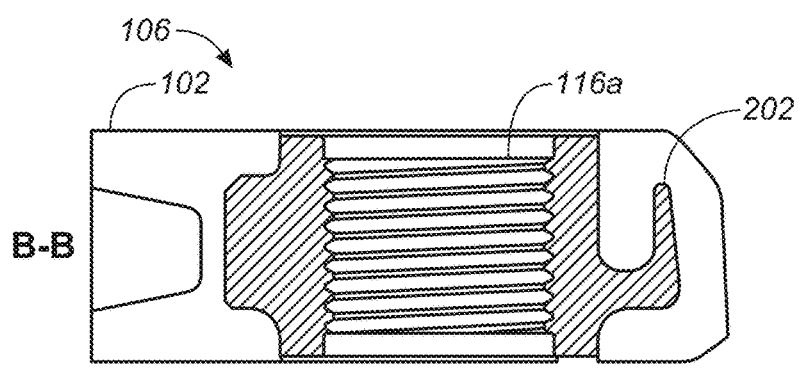
FIG. 5C is a cross-section view B-B of the pedal insert in a portion of the crank arm body, in accordance with an embodiment.

FIG. 5C is a cross-section view of the pedal insert 106 in a portion of the crank arm body 102 shown in accordance with an embodiment. In one embodiment, pedal insert 106 includes an internal retaining feature 116a such as threads, or the like, for coupling a pedal therewith and undercuts 202 for maintaining the position of pedal insert 106 relative to the body 102.

Figure 6A:
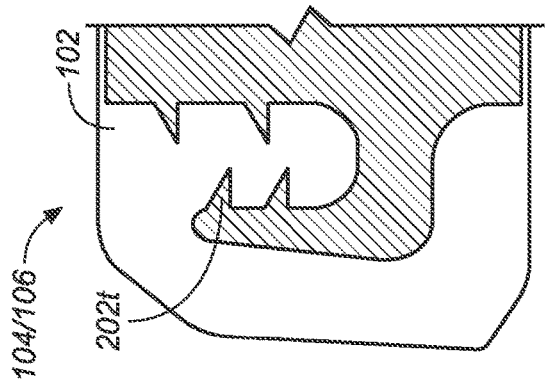
FIG. 6A is a cross-section view A-A/B-B of the insert with an angled undercut in a portion of the crank arm body, in accordance with an embodiment.

FIG. 6A is a cross-section view of the spindle insert 104 and/or pedal insert 106 with an angled undercut 202a in a portion of the crank arm body 102 shown in accordance with an embodiment. In one embodiment, the angled undercut 202a is more than 90 degrees.

Figure 6B:
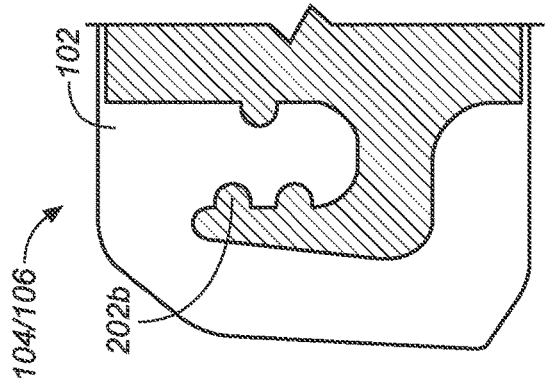
FIG. 6B is a cross-section view A-A/B-B of the insert with one or more bumps thereon in a portion of the crank arm body, in accordance with an embodiment.
Figure 6C:
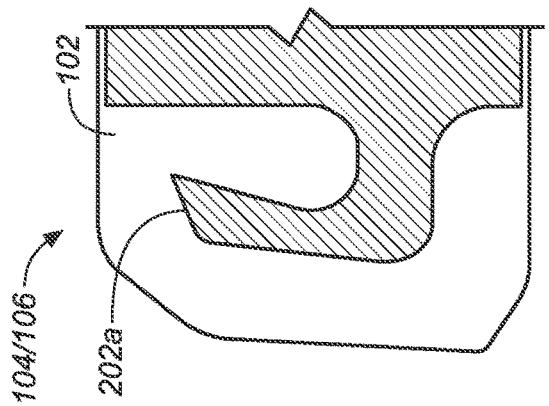
FIG. 6C is a cross-section view A-A/B-B of the insert with one or more teeth thereon in a portion of the crank arm body, in accordance with an embodiment.

FIG. 6B is a cross-section view of the spindle insert 104 and/or pedal insert 106 with one or more bumps 202b thereon in a portion of the crank arm body 102 shown in accordance with an embodiment. FIG. 6C is a cross-section view of the spindle insert 104 and/or pedal insert 106 with one or more teeth 202t thereon in a portion of the crank arm body 102 shown in accordance with an embodiment. In general, features such as bumps, ridges, teeth, or the like on one or more surfaces of spindle insert 104 and/or pedal insert 106 enhance the locking of the spindle insert 104 and/or pedal insert 106 with the body 102. In one embodiment, the features such as bumps, ridges, teeth, or the like are running circumferentially about spindle insert 104 and/or pedal insert 106.

Figure 7:
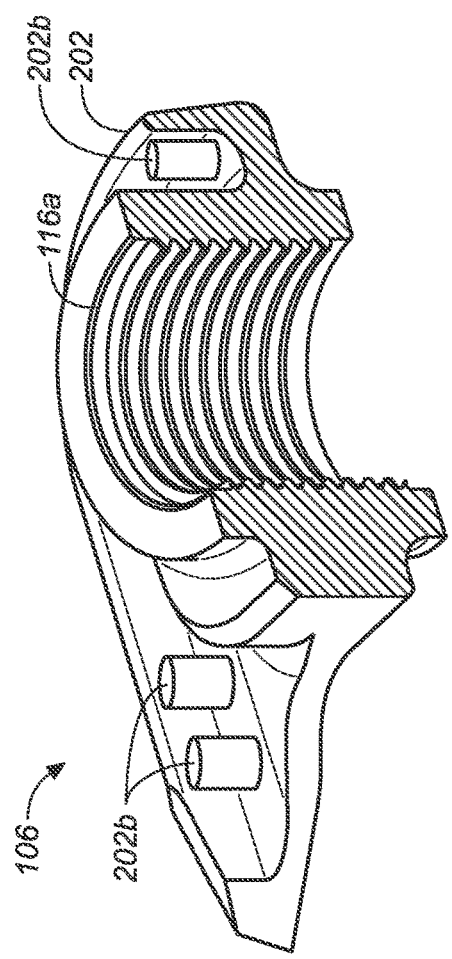
FIG. 7 is a cross-section view of the pedal insert with one or more bumps thereon, in accordance with an embodiment.

FIG. 7 is a cross-section view of the pedal insert 106 (similar to pedal insert 106 of FIGS. 5A-5C) with one or more bumps 202b thereon shown in accordance with an embodiment. In one embodiment, the one or more bumps 202b (or other features such as ridges, teeth, or the like) are running parallel to the pedal insert 106 axis. In general, the features such as bumps, ridges, teeth, or the like help lock on to the composite after curing and cooling.

Figure 8:
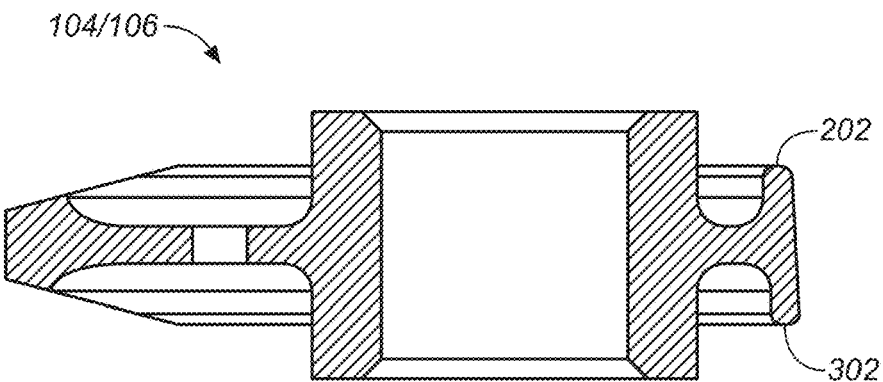
FIG. 8 is a cross-section view of the insert with two undercuts, in accordance with an embodiment.

FIG. 8 is a cross-section view of the spindle insert 104 and/or pedal insert 106 with two undercuts 202 and 302 (e.g., a two sided undercut) shown in accordance with an embodiment. In one embodiment, the two sided undercut provides additional locking and is a symmetrical design. In one embodiment, one or both of undercuts 202 and/or 302 can include additional retaining features such as bumps, ridges, teeth, or the like on one or more surfaces thereof to include one or both of undercuts 202 and 302.

Figure 9:
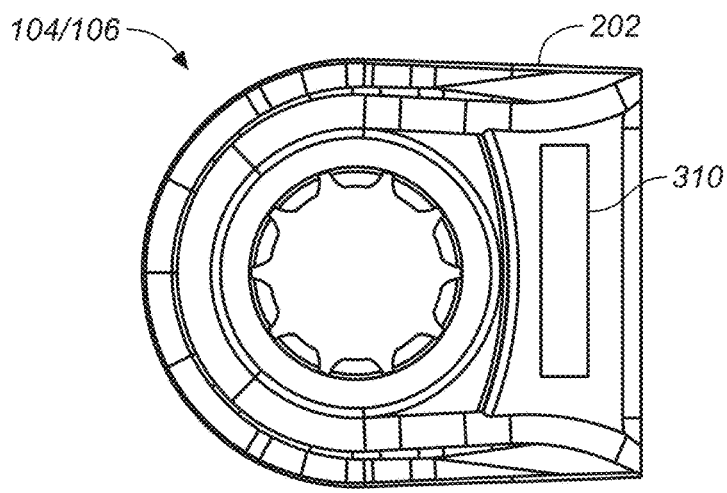
FIG. 9 is a top view of the insert with an additional retaining feature cutout, in accordance with an embodiment.

FIG. 9 is a top view of the spindle insert 104 and/or pedal insert 106 with an additional retaining feature cutout(s) 310 shown in accordance with an embodiment. In one embodiment, retaining features cutout(s) 310 includes a slot or slots (or other geometric design) to provide extra faces to lock onto. For example, the composite body 102 will be formed or placed in these retaining feature cutout(s) 312 and the composite will join together through the retaining feature cutout(s) 312 during molding to lock the spindle insert 104 and/or pedal insert 106 together with body 102.

Figure 10:
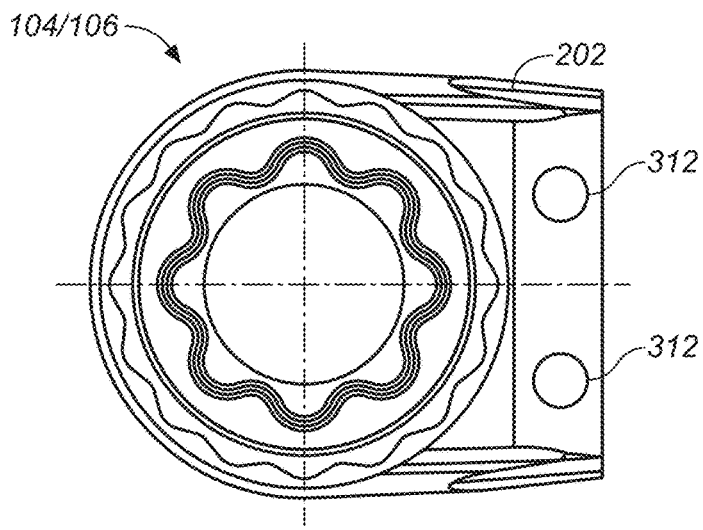
FIG. 10 is a top view of the insert with an additional retaining feature cutout having a different geometric shape, in accordance with an embodiment.

FIG. 10 is a top view of the insert with an additional retaining feature cutout(s) 312 having a different geometric shape shown in accordance with an embodiment. In one embodiment, retaining features cutout(s) 312 includes a circle or circles (or other geometric design such as star, oval, ellipse, or the like) to provide extra faces to lock onto. For example, the composite body 102 will be formed or placed in these retaining feature cutout(s) 312 and the composite will join together through the retaining feature cutout(s) 312 during molding to lock the spindle insert 104 and/or pedal insert 106 together with body 102.

Figure 11:
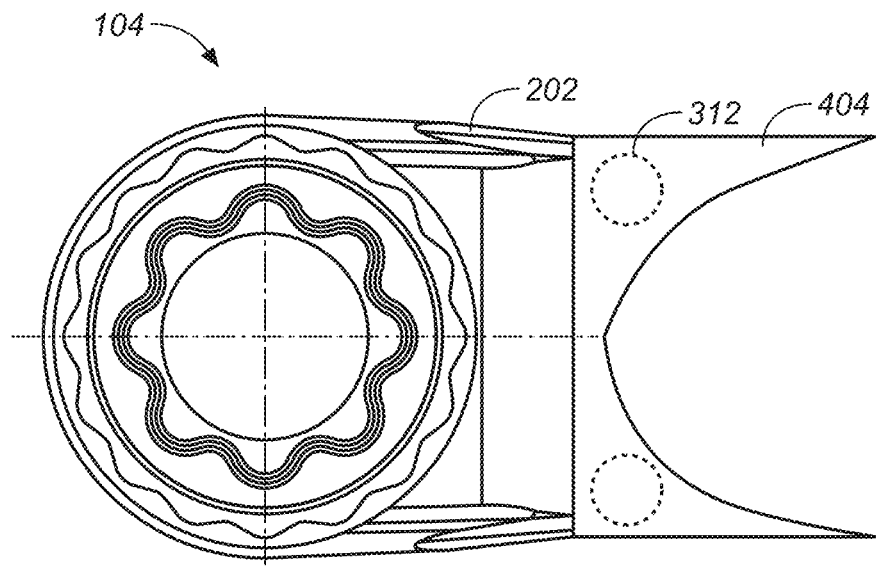
FIG. 11 is a top view of the spindle insert with additional robust features, in accordance with an embodiment.

FIG. 11 is a top view of the spindle insert 104 with additional robust features 404 shown in accordance with an embodiment. In one embodiment, spindle insert 104 can include one or more retaining feature cutout(s) 310 and or 312, and/or additional retaining features such as bumps, ridges, teeth, or the like on one or more surfaces thereof including the additional robust features 404. In one embodiment, the additional robust features 404 provide an additional amount of surface area for spindle insert 104 to be in contact with body 102 to provide additional strength characteristics. In general, the additional strength might be important for vehicles such as mountain bikes, gravel bikes, or the like that will encounter larger stresses on the crank arm 100. In one embodiment, the size, shape, surface area, undercut, or the like of additional robust features 406 is adjustable depending upon the structural requirements of crank arm 100 and/or the vehicle to which the crank arm 100 is to be mounted.

Figure 12:
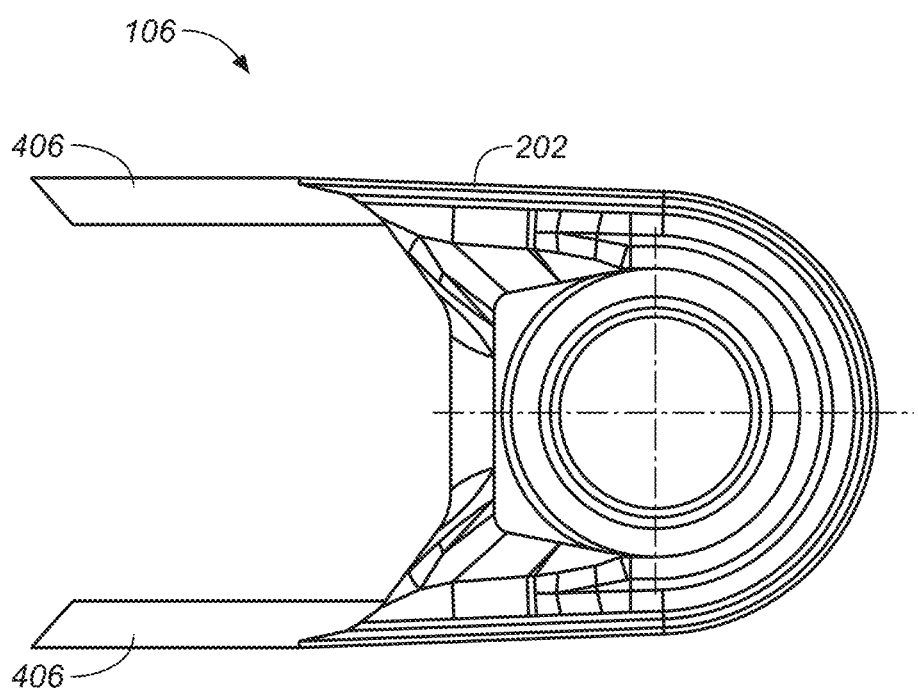
FIG. 12 is a top view of the pedal insert with additional robust features, in accordance with an embodiment.

FIG. 12 is a top view of the pedal insert 106 with additional robust features 406 shown in accordance with an embodiment. In one embodiment, pedal insert 106 can include one or more retaining feature cutout(s) 310 and or 312, and/or additional retaining features such as bumps, ridges, teeth, or the like on one or more surfaces thereof including the additional robust features 406. In one embodiment, the additional robust features 406 provide an additional amount of surface area for pedal insert 106 to be in contact with body 102 to provide additional strength characteristics. In general, the additional strength might be important for vehicles such as mountain bikes, gravel bikes, or the like that will encounter larger stresses on the crank arm 100 than another vehicle such as a roadbike, etc. In one embodiment, the size, shape, surface area, undercut, or the like of additional robust features 406 is adjustable depending upon the structural requirements of crank arm 100 and/or the vehicle to which the crank arm 100 is to be mounted.

The examples set forth herein were presented in order to best explain, to describe particular applications, and to thereby enable those skilled in the art to make and use embodiments of the described examples. However, those skilled in the art will recognize that the foregoing description and examples have been presented for the purposes of illustration and example only. The description as set forth is not intended to be exhaustive or to limit the embodiments to the precise form disclosed. Rather, the specific features and acts described above are disclosed as example forms of implementing the Claims.

Reference throughout this document to "one embodiment," "certain embodiments," "an embodiment," "various embodiments," "some embodiments," "various embodiments", or similar term, means that a particular feature, structure, or characteristic described in connection with that embodiment is included in at least one embodiment. Thus, the appearances of such phrases in various places throughout this specification are not necessarily all referring to the same embodiment. Furthermore, the particular features, structures, or characteristics of any embodiment may be combined in any suitable manner with one or more other features, structures, or characteristics of one or more other embodiments without limitation.

What is claimed is:

1. A hybrid assembly comprising:
a metallic component having a first coefficient of thermal expansion (CTE), said metallic component comprising:
a first retention shape;
an outer wall of said first retention shape; and
an undercut formed exterior to said outer wall of said first retention shape such that there is a groove between said outer wall of said first retention shape and said undercut; and
a composite component having a second CTE, said second CTE different from said first CTE, wherein said metallic component including said groove is at least partially within said composite component when said composite component is being formed, such that said difference in said first CTE and said second CTE causes said groove to contract about said composite component to provide a compression to a portion of said composite component within said groove, wherein said metallic component further comprises:
a two sided undercut formed exterior to said outer wall of said first retention shape such that there is an upper groove and a lower groove between said outer wall of said first retention shape and said two sided undercut.

2. The hybrid assembly of claim 1, wherein said composite component is a base portion of a bicycle crank arm extending along a body axis and having a first body end and a second body end, said second body end axially spaced apart from said first body end.

3. The hybrid assembly of claim 2, wherein said metallic component is a spindle insert mounted within said bicycle crank arm at said first body end, said spindle insert extending along an insert axis, said insert axis orthogonal to said body axis of said bicycle crank arm.

4. The hybrid assembly of claim 2, wherein said metallic component is a pedal insert mounted within said bicycle crank arm at said second body end, said pedal insert extending along an insert axis, said insert axis orthogonal to said body axis of said bicycle crank arm.

5. The hybrid assembly of claim 2, further comprising:
said metallic component is a spindle insert mounted within said bicycle crank arm at said first body end, said spindle insert extending along an insert axis, said insert axis orthogonal to said body axis of said bicycle crank arm; and
a metallic pedal insert comprising: an internal retaining feature, wherein said internal retaining feature is selected from a group consisting of threads, and splines, a second groove between an outer wall of said internal retaining feature and a second undercut, said metallic pedal insert mounted within said bicycle crank arm at said second body end, said metallic pedal insert extending along an insert axis, said metallic pedal insert axis orthogonal to said body axis of said bicycle crank arm, wherein said metallic pedal insert, including said second groove, is at least partially within said composite component when said composite component is being formed.

6. The hybrid assembly of claim 1, wherein said metallic component further comprises:
at least one cutout formed in a portion of said metallic component exterior to said outer wall of said first retention shape, said at least one cutout to provide an extra face for said composite to lock into when said composite component is being formed about said portion of said metallic component.

7. The hybrid assembly of claim 1, wherein said metallic component further comprises:
at least one retention feature projecting from a portion of said outer wall of said first retention shape, from said groove, or from said undercut, said at least one retention feature to provide an extra face for said composite to lock into when said composite component is being formed about said portion of said metallic component.

8. A bicycle crank arm assembly comprising:
a metallic component having a first coefficient of thermal expansion (CTE), said metallic component comprising:
a first retention shape;
an outer wall of said first retention shape; and
an undercut formed exterior to said outer wall of said first retention shape such that there is a groove between said outer wall of said first retention shape and said undercut; and
a composite crank arm having a second CTE, said second CTE different from said first CTE, wherein said metallic component including said groove is at least partially within said composite crank arm when said composite crank arm is being formed, such that said difference in said first CTE and said second CTE causes said groove to contract about said composite crank arm to provide a compression to a portion of said composite crank arm within said groove, wherein said metallic component further comprises:
a two sided undercut formed exterior to said outer wall of said first retention shape such that there is an upper groove and a lower groove between said outer wall of said first retention shape and said two sided undercut.

9. The bicycle crank arm assembly of claim 8, wherein said composite crank arm comprises:
a base portion extending along a body axis and having a first body end and a second body end, said second body end axially spaced apart from said first body end.

10. The bicycle crank arm assembly of claim 9, wherein said metallic component is a spindle insert mounted within said composite crank arm at said first body end, said spindle insert extending along an insert axis, said insert axis orthogonal to said body axis of said composite crank arm.

11. The bicycle crank arm assembly of claim 9, wherein said metallic component is a pedal insert mounted within said composite crank arm at said second body end, said pedal insert extending along an insert axis, said insert axis orthogonal to said body axis of said composite crank arm.

12. The bicycle crank arm assembly of claim 9, further comprising:
said metallic component is a spindle insert mounted within said composite crank arm at said first body end, said spindle insert extending along an insert axis, said insert axis orthogonal to said body axis of said composite crank arm and
a metallic pedal insert comprising: an internal retaining feature, wherein said internal retaining feature is selected from a group consisting of threads, and splines, a second groove between said outer wall of said internal retaining feature and a second undercut, said metallic pedal insert mounted within said composite crank arm at said second body end, said metallic pedal insert extending along an insert axis, said metallic pedal insert axis orthogonal to said body axis of said composite crank arm, wherein said metallic pedal insert, including said groove, is at least partially within said composite crank arm when said composite crank arm is being formed.

13. The bicycle crank arm assembly of claim 8, wherein said metallic component further comprises:
at least one cutout formed in a portion of said metallic component exterior to said outer wall of said first retention shape, said at least one cutout to provide an extra face for said composite crank arm to lock into when said composite crank arm is being formed about said portion of said metallic component.

14. The bicycle crank arm assembly of claim 8, wherein said metallic component further comprises:
at least one retention feature projecting from a portion of said outer wall of said first retention shape, from said groove, or from said undercut, said at least one retention feature to provide an extra face for said composite crank arm to lock into when said composite crank arm is being formed about said portion of said metallic component.

15. A bicycle crank arm assembly comprising:
a plurality of metallic components having a first coefficient of thermal expansion (CTE), each of said plurality of metallic components comprising:
a retaining feature, wherein said retaining feature is selected from a group consisting of threads, and splines;
an outer wall of said retaining feature; and
an undercut formed exterior to said outer wall of said retaining feature such that there is a groove between said outer wall of said retaining feature and said undercut; and
a composite crank arm having a second CTE, said second CTE different from said first CTE, said composite crank arm comprising:
a base portion extending along a body axis and having a first body end and a second body end, said second body end axially spaced apart from said first body, wherein each of said plurality of said metallic components including said groove are at least partially within said composite crank arm when said composite crank arm is being formed, such that said difference in said first CTE and said second CTE causes said groove between said outer wall of said retaining feature and said undercut of said plurality of metallic components to contract about said composite crank arm to provide a compression to a portion of said composite crank arm within each of said groove, wherein at least one of said plurality of said metallic components further comprises:
  a two sided undercut formed exterior to said outer wall of said retaining feature such that there is an upper groove and a lower groove between said outer wall of said retaining feature and said two sided undercut.

16. The bicycle crank arm assembly of claim 15, further comprising:
  at least one of said plurality of metallic components is a spindle insert mounted within said composite crank arm at said first body end, said spindle insert extending along an insert axis, said insert axis orthogonal to said body axis of said composite crank arm; and
  at least one of said plurality of metallic components is a pedal insert mounted within said composite crank arm at said second body end, said pedal insert extending along an insert axis, said insert axis orthogonal to said body axis of said composite crank arm.

17. The bicycle crank arm assembly of claim 15, wherein at least one of said plurality of said metallic components further comprises:
  at least one cutout formed in a portion of at least one of said plurality of said metallic components exterior to said outer wall of said retaining feature, said at least one cutout to provide an extra face for said composite crank arm to lock into when said composite crank arm is being formed; and
  at least one retention feature projecting from a portion of said outer wall of said retaining feature, from said groove, or from said undercut, said at least one retention feature to provide an extra face for said composite crank arm to lock into when said composite crank arm is being formed about said portion of said metallic component.

* * * * *